(12) United States Patent
Hessler et al.

(10) Patent No.: US 10,034,299 B2
(45) Date of Patent: Jul. 24, 2018

(54) COOPERATING CLUSTERS IN CELLULAR COMMUNICATIONS SYSTEMS

(71) Applicant: TELEFONAKTIEBOLAGET L M ERICSSON (PUBL), Stockholm (SE)

(72) Inventors: Martin Hessler, Linköping (SE); Ke Wang Helmersson, Linköping (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 156 days.

(21) Appl. No.: 14/893,605

(22) PCT Filed: May 28, 2013

(86) PCT No.: PCT/EP2013/060977
§ 371 (c)(1),
(2) Date: Nov. 24, 2015

(87) PCT Pub. No.: WO2014/191026
PCT Pub. Date: Dec. 4, 2014

(65) Prior Publication Data
US 2016/0105903 A1    Apr. 14, 2016

(51) Int. Cl.
*H04W 72/00*   (2009.01)
*H04W 72/12*   (2009.01)
(Continued)

(52) U.S. Cl.
CPC ....... *H04W 72/1231* (2013.01); *H04W 16/02* (2013.01); *H04W 92/20* (2013.01)

(58) Field of Classification Search
CPC . H04W 84/005; H04W 84/10; H04W 84/105; H04W 84/12; H04W 84/14; H04W 84/18–84/22
See application file for complete search history.

(56) References Cited

U.S. PATENT DOCUMENTS 7,096,039 B2 * 8/2006 Chuah ................... H04L 12/189
                                                    455/456.5
7,769,926 B2 * 8/2010 Wu ...................... H04W 72/1284
                                                    370/330
(Continued)

FOREIGN PATENT DOCUMENTS

EP    2538603 A1   12/2012
WO  2012062166 A1    5/2012

OTHER PUBLICATIONS

"3rd Generation Partnership Project; Technical Specification Group Radio Access Network; Evolved Universal Terrestrial Radio Access (E-UTRA); Physical layer procedures (Release 9)" 3GPP TS 36.213, V9.3.0, Sep. 2010, 80 pages.
(Continued)

*Primary Examiner* — San Htun
(74) *Attorney, Agent, or Firm* — Patent Portfolio Builders, PLLC

(57) ABSTRACT

There are provided mechanisms for establishing a cooperating cluster (6a) in a cellular communications system (la-Id). According to one aspect a request for establishing a cooperating cluster (6a) to a second network node (2b) is transmitted from a first network node (2a). The cooperating cluster (6a) comprises at least one cell (3b, 3f) of the first network node (2a) and at least one cell (3g) of the second network node (2b). The request comprises a metric and identification of the cells to be clustered. An acceptance is by the first network node (2a) received (S104) from the second network node (2b) to implement operation of the cooperating cluster (6a).

12 Claims, 5 Drawing Sheets

(51) Int. Cl.
*H04W 16/02* (2009.01)
*H04W 92/20* (2009.01)

(56) References Cited

U.S. PATENT DOCUMENTS

| | | | |
|---|---|---|---|
| 2010/0056215 A1 | 3/2010 | Gorokhov et al. | |
| 2011/0223900 A1* | 9/2011 | Yu ........................ | H04W 72/08 455/422.1 |
| 2012/0094710 A1* | 4/2012 | Jia ...................... | H04W 72/044 455/524 |
| 2013/0322235 A1* | 12/2013 | Khoryaev ............. | H04W 24/10 370/229 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 9)" 3GPP TS 36.331, V9.9.0, Dec. 2011, 253 pages.
International Search Report and Written Opinion issued in corresponding International Application No. PCT/EP2013/060977 dated Feb. 4, 2014, 10 pages.
EP office action in application No. 13726177.2 dated Oct. 7, 2016.

\* cited by examiner

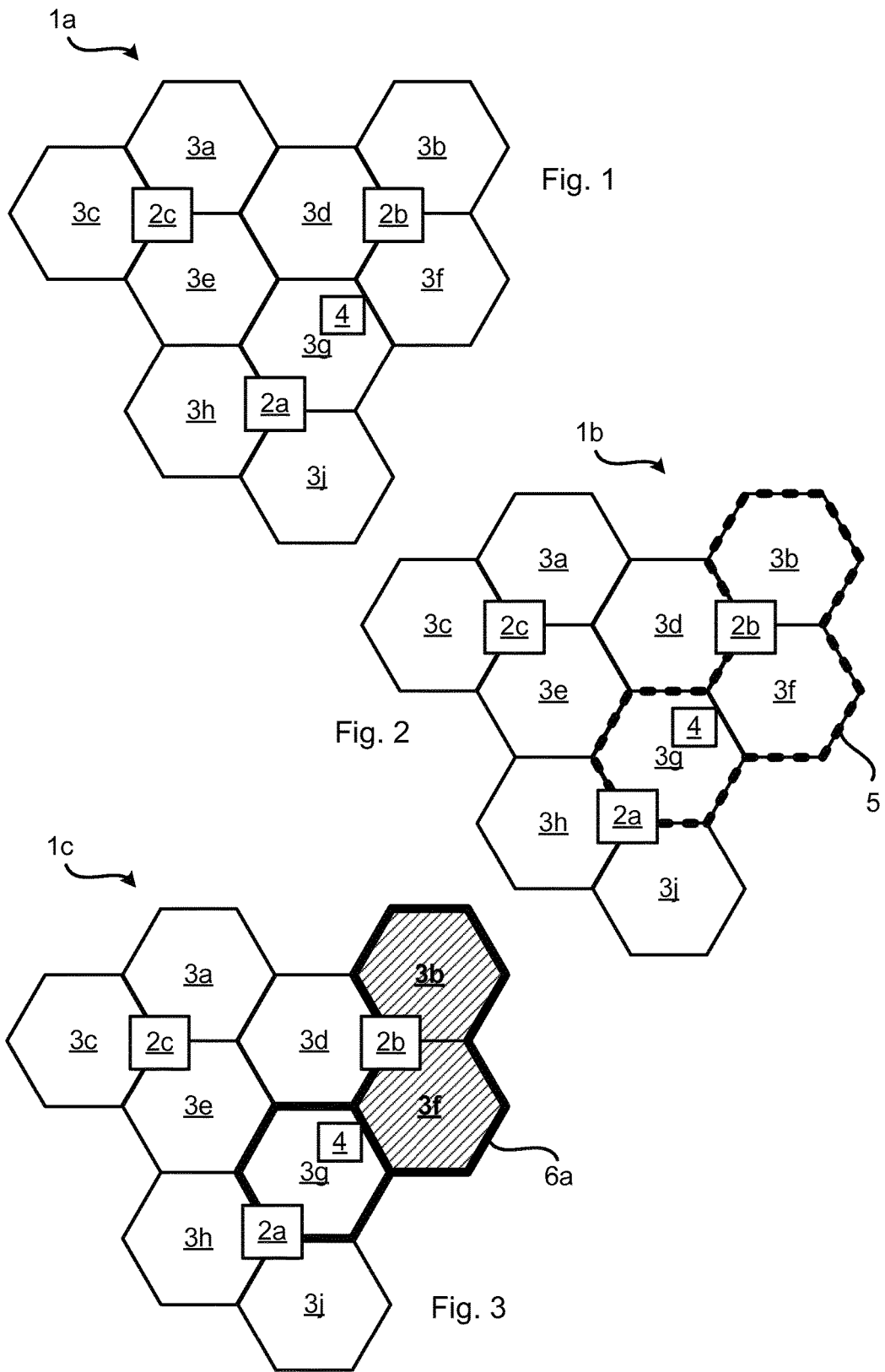

COOPERATING CLUSTERS IN CELLULAR COMMUNICATIONS SYSTEMS

CROSS REFERENCE TO RELATED APPLICATION(S)

This application is a 35 U.S.C. § 371 National Phase Entry Application from PCT/EP2013/060977, filed May 28, 2013, designating the United States, the disclosure of which is incorporated by reference.

TECHNICAL FIELD

Embodiments presented herein relate to cellular communications systems, and particularly to methods, network nodes and a computer programs for establishing a cooperating cluster in a cellular communications system.

BACKGROUND

In mobile communication networks, there is always a challenge to obtain good performance and capacity for a given communications protocol, its parameters and the physical environment in which the mobile communication network is deployed.

Telecommunications standards such as the long term evolution (LTE) telecommunications standard and the high speed packet access (HSPA) standard are designed for a frequency reuse of one. This means that every network node uses the whole system bandwidth for transmission. This further means that in cellular communications systems there is no frequency planning among cells to cope with interference from neighboring cells.

Coordinated scheduling is a means to mitigate interference and improve performance in cellular communications systems. The basic idea of coordinated scheduling is to take a joint decision on when to transmit from different network nodes (such as from different eNodeBs). Examples of two network configurations to realize inter-network node coordination are centralized and distributed coordination. With centralized configuration a control unit connects a number of network nodes via e.g. optical fiber. Coordinating decisions are conducted at the control unit in a centralized manner. Ideally, coordinating the entire cellular communications system (i.e., by incorporating all cells of the cellular communications system in one single cooperating cluster) could allow for optimized performance on a complete network level. However, the complexity of coordinating a large network increases exponentially and hence global optimization may not be realistic in a real-world network environment. A traditional way to reduce the complexity of coordination is to divide the entire cellular communications system into a number of clusters by limiting the number of cells in each cluster. One way to form a cluster is to use each site as a cluster. Each cluster thus includes all the sectors of the site. A site may correspond to a network node. Each such cluster may also include micro or pico cells within the site. Such clusters have advantage of fast backhaul. However, coordinated scheduling between cells in such clusters cannot reduce inter-site interference.

With distributed configuration, the coordinating decisions may be exchanged by means of the X2 interface, or a similar proprietary-interface, between the cooperating network nodes. The network nodes that are coordinated form a so-called cooperating cluster. Scheduling decisions may then be shared within the cooperating cluster.

Traditional coordinated scheduling neither takes into account limitations in backhaul capacity and delay, nor computational resources. This makes it difficult or even impossible to implement the coordinated scheduling in practical deployments.

One particular type of traditional coordination uses direct optical fiber, for example, used in systems such as Radio over Fiber (RoF) or Remote Radio Head (RRH), to establish the cooperating cluster. The coordination is then limited to within the cluster and inter-cluster interference cannot be handled with such a configuration.

Site coordination is one alternative to achieve cooperation without relying on a direct optical fiber. However, to overcome the inter-site interference and thus to achieve performance gains, many sites and user equipment (UE) operatively connected to the sites need traditionally to be coordinated. Coordinating many sites and UEs increases the computational and signaling demands exponentially.

Standard measurement reports based upon the network characteristics may be used to define a trigger which identifies candidate UEs and cells that could benefit from coordination. One type of measurement reports available in LTE are reports from UEs receiving strong signals from a network node in a neighboring cell; these UEs transmit to the network a handover report. Handover (HO) assisted cooperation is one approach to establish cooperation without relying on direct fiber. In this approach, UEs that enter a HO zone measure strong neighboring cells, e.g. within 6 dB compare to the network node of the serving cell, and report this to the network node of the serving ce, see 3GPP 36.331, "Evolved Universal Terrestrial Radio Access Network (E-UTRAN); Radio Resource Control (RRC)". The coordination between the serving network node and the reported neighboring cells can be established by the X2-interface.

Further, signaling overhead increases with the number of cells in the cooperating cluster since standard measurement reports may not be sufficient for making a correct scheduling decision.

Hence, there is still a need for an improved coordinated scheduling in cellular communications systems.

SUMMARY

An object of embodiments herein is to provide improved coordinated scheduling in cellular communications system.

The inventors of the enclosed embodiments have realized that existing downlink interference management has the potential to provide large performance gains. But due to limited measurements and restrictions in the backhaul communication between cells these performance gains have traditionally not been possible to harvest. The inventors of the enclosed embodiments have further realized that the system requirements for coordinated scheduling may be relaxed whilst still maintaining much of the performance gains from coordinated scheduling.

A particular object is therefore to provide improved coordinated scheduling in cellular communications system by establishing a cooperating cluster in the cellular communications system.

According to a first aspect there is presented a method for establishing a cooperating cluster in a cellular communications system. The method is performed by a first network node. The method comprises transmitting a request for establishing a cooperating cluster to a second network node, the cooperating cluster comprising at least one cell of the first network node and at least one cell of the second network node, the request comprising a metric and identification of the cells to be clustered. The method comprises receiving an acceptance from the second network node to implement operation of the cooperating cluster.

According to a second aspect there is presented a method for establishing a cooperating cluster in a cellular communications system. The method is performed by a second network node. The method comprises receiving a request for establishing a cooperating cluster from a first network node, the cooperating cluster comprising at least one cell of the first network node and at least one cell of the second network node, the request comprising a metric and identification of the cells to be clustered. The method comprises evaluating acceptance of the request by verifying that an upper limit on allowed number of cooperations has not been reached and by comparing the metric to a metric of any on-going cooperating clusters involving the second network node. The method comprises in a case the acceptance does not cause operation of any previously established and still on-going cooperating clusters involving the second network node to be discontinued or in a case of no on-going cooperation: transmitting a direct acceptance of implementing the cooperating cluster to the first network node. The method comprises in a case the acceptance causes operation of at least one previously established and still on-going cooperating cluster involving the second network node to be discontinued: transmitting an acceptance resulting in delayed implementation of the cooperating cluster at the first network node to the first network node.

Advantageously this enables cooperation with as small cooperation delay as possible and may thus provide an optimal signaling scheme to use over a backhaul with known latency. Further, improvements over traditional cooperating methods are provided even with 3GPP Release 8 compliant UEs (i.e. UEs that have simple measurement reports) with cell edge gains of at least 13% according to network simulations. For later releases (e.g. 3GPP Release 11 compliant UEs) where additional measurement reports are available the performance is even further improved.

Advantageously this also enables higher cell-edge throughput, even with slow backhaul. The throughput gains can be directly translated into network gains with backhaul delays <30 ms (single way between cooperating network nodes).

According to a third aspect there is presented a first network node for establishing a cooperating cluster in a cellular communications system. The first network node comprises a transmitter arranged to transmit a request for establishing a cooperating cluster to a second network node, the cooperating cluster comprising at least one cell of the first network node and at least one cell of the second network node, the request comprising a metric and identification of the cells to be clustered. The first network node comprises a receiver arranged to receive an acceptance from the second network node to implement operation of the cooperating cluster.

According to a fourth aspect there is presented a second network node for establishing a cooperating cluster in a cellular communications system. The second network node comprises a receiver arranged to receive a request for establishing a cooperating cluster from a first network node, the cooperating cluster comprising at least one cell of the first network node and at least one cell of the second network node, the request comprising a metric and identification of the cells to be clustered. The second network node comprises a processing unit arranged to evaluate acceptance of the request by verifying that an upper limit on allowed number of cooperations has not been reached and by comparing the metric to a metric of any on-going cooperating clusters involving the second network node. The second network node comprises a transmitter arranged to, in a case the acceptance does not cause operation of any previously established and still on-going cooperating clusters involving the second network node to be discontinued or in a case of no on-going cooperation, transmit, a direct acceptance of implementing the cooperating cluster to the first network node. The second network node comprises a transmitter arranged to, in a case the acceptance causes operation of at least one previously established and still on-going cooperating cluster involving the second network node to be discontinued, transmit an acceptance resulting in delayed implementation of the cooperating cluster at the first network node to the first network node.

According to a fifth aspect there is presented a computer program for establishing a cooperating cluster in a cellular communications system, the computer program comprising computer program code which, when run on a first network node, causes the first network node to perform a method according to the first aspect.

According to a sixth aspect there is presented a computer program for establishing a cooperating cluster in a cellular communications system, the computer program comprising computer program code which, when run on a second network node, causes the second network node to perform a method according to the second aspect.

According to a seventh aspect there is presented a computer program product comprising a computer program according to at least one of the fifth aspect and the sixth aspect and a computer readable means on which the computer program is stored.

It is to be noted that any feature of the first, second, third, fourth, fifth, sixth, and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 1, 2, 3 and 4 are schematic diagrams illustrating cellular communications systems where embodiments presented herein may be applied;

DETAILED DESCRIPTION

Figure 4:
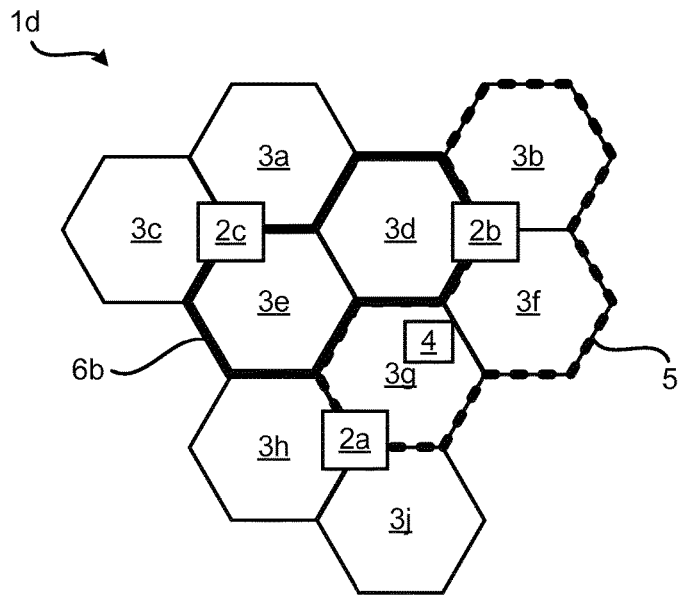

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

FIG. 1 illustrates part of a cellular communications system $1a$ where embodiments presented herein can be applied. The cellular communications system $1a$ comprises network nodes $2a$, $2b$, $2c$ providing network coverage over cells $3a$, $3b$, ..., $3j$. Each cell $3a$-$j$ is served by at least one of the network nodes $2a$-$c$. A user equipment (UE) 4, positioned in a particular cell is thus provided network service by the network node $2a$-$c$ serving that particular cell. Further, the network nodes $2a$-$c$ are arranged to communicate with other network nodes $2a$-$c$ via communications links. The network nodes $2a$-$c$ are also operatively connected to a core network. The core network may provide services and data to the UE 4 operatively connected to at least one of the network nodes $2a$-$c$. As the skilled person understands, the communications system $1a$ may comprise a plurality of network nodes $2a$-$c$ and a plurality f UE 4 operatively connected to at least one of the plurality of network nodes $2a$-$c$. The communications system $1a$ may generally comply with any one or a combination of W-CDMA (Wideband Code Division Multiplex), LTE (Long Term Evolution), EDGE (Enhanced Data Rates for GSM Evolution, Enhanced GPRS (General Packet Radio Service)), CDMA2000 (Code Division Multiple Access 2000), WiFi, microwave radio links, etc., as long as the principles described hereinafter are applicable.

The embodiments disclosed herein relate to establishing a cooperating cluster in the cellular communications system $1a$. The embodiments disclosed herein are based on the understanding that UEs, may be dynamically identified for coordination, which, for example, may involve taking joint scheduling decisions, and which is based on dynamically form cooperating clusters for the UEs.

Standard measurement reports based upon the network characteristics may be used to define a trigger which identifies candidate UEs and cells that could benefit from coordination. Coordination is only initiated when determined to be beneficial for the current backhaul capacity and delay (sometimes referred to as latency) with consideration to the UE information available both in terms of radio conditions and traffic characteristics. The coordinated, and thus cooperating, clusters may thereby be established and released dynamically. Further, there is disclosed a handshaking protocol for distributing autonomous self-optimization of the coordination in the network that forms the efficient cooperating clusters. The coordination is further based on only a considering a limited number of cells to be coordinated. Further, there is disclosed a signaling scheme between cooperating network nodes $2a$-$c$ to reduce, or even minimize, latency requirements on the backhaul.

Particularly, in order to obtain establishment of a cooperating cluster in the cellular communications system there is provided a first network node (referred to as network node $2a$ in the figures), a method performed in the first network node, a computer program comprising code, for example in the form of a computer program product, that when run on the first network node causes the first network node to perform the method.

In order to obtain establishment of a cooperating cluster in the cellular communications system there is further provided a second network node (referred to as network node $2b$ in the figures), a method performed in the second network node, a computer program comprising code, for example in the form of a computer program product, that when run on the second network node causes the second network node to perform the method.

There is also provided a third network node (referred to as network node $2c$ in the figures).

It is to be noted that although the network nodes $2a$-$2c$ are herein referred to their current role (first, second, and third network node, respectively), each network node $2a$-$2c$ may be arranged also to take other roles. For example, the first network node may also take the role of the second network node, and vice versa. Hence, all network nodes $2a$-$2c$ may comprise the same hardware, software, middleware, etc. and thus be arranged to perform the same functionality.

Figure 5:
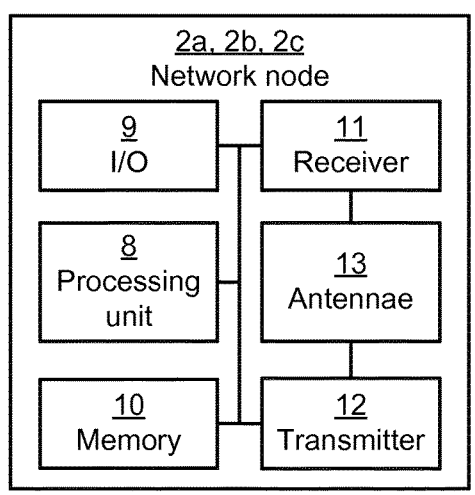
FIG. 5 is a schematic diagram showing functional modules of a network node.

FIG. 5 schematically illustrates, in terms of a number of functional modules, the components of a network node $2a$, $2b$, $2c$. The network node $2a$, $2b$, $2c$ of FIG. 5 may comprise functional blocks, provided by hardware, software, or as a combination thereof, which may enable the network node $2a$, $2b$, $2c$ to perform the disclosed functionality, method steps, etc., associated with the first network node $2a$, the second network node $2b$, and/or the third network node $2c$.

A processing unit 8 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product $14a$, $14b$ (as in FIG. 6), e.g. in the form of a memory 10. Thus the processing unit 8 is thereby arranged to execute methods as herein disclosed. The memory 10 may also comprise persistent storage, which, for example, can be any single one or combination of magnetic memory, optical memory, solid state memory or even remotely mounted memory. The network node $2a$-$c$ may further comprise an input/output (I/O) interface 9 for receiving and providing information to other network nodes $2a$-$c$.

The network node $2a$-$c$ also comprises one or more transmitters 12 and receivers 11, comprising analogue and digital components and a suitable number of antennae 13 for radio communication with the UE 4. The processing unit 8 controls the general operation of the network node $2a$-$c$, e.g. by sending control signals to the transmitter 12 and/or receiver 11 and receiving reports from the transmitter 12 and/or receiver 11 of its operation. Other components, as well as the related functionality, of the network node $2a$-$c$ are omitted in order not to obscure the concepts presented herein.

Figure 6:
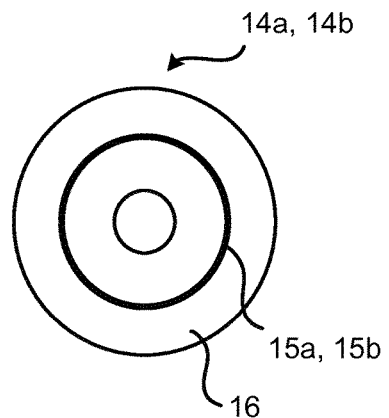
FIG. 6 shows one example of a computer program product comprising computer readable means.
Figure 7:
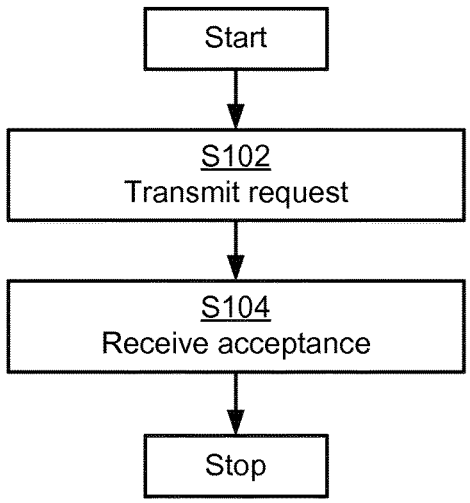
FIGS. 7, 8, 9 and 10 are flowcharts of methods according to embodiments presented herein.
Figure 8:
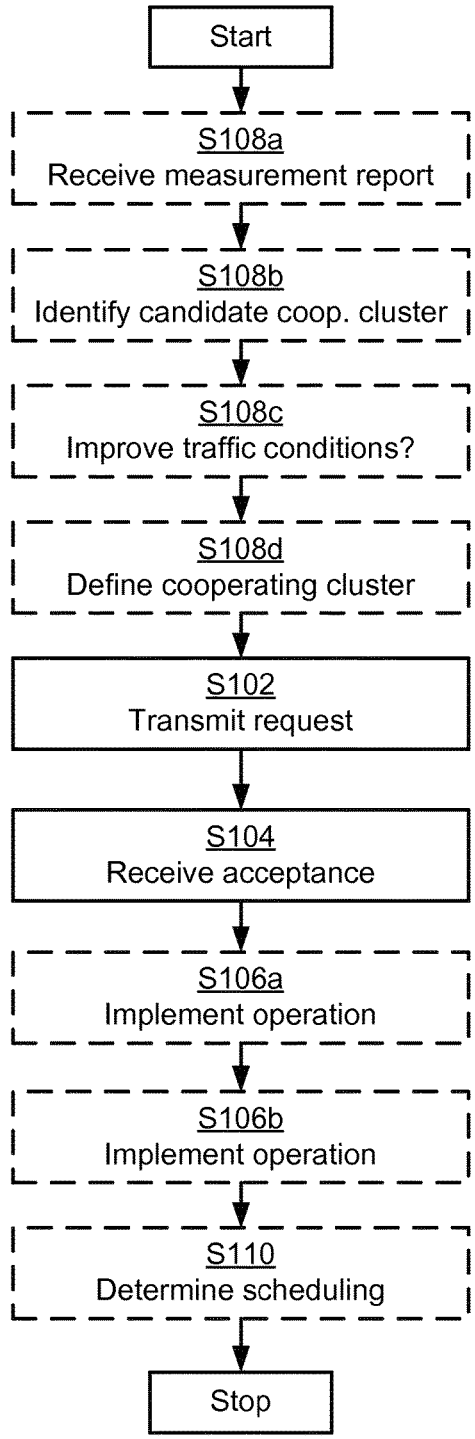
Figure 9:
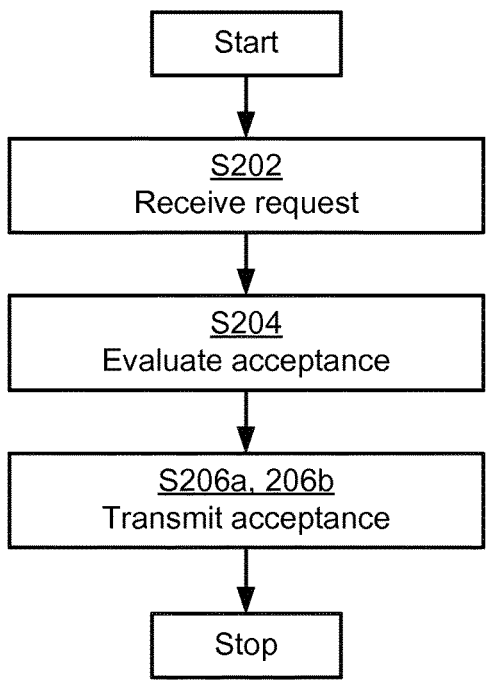
Figure 10:
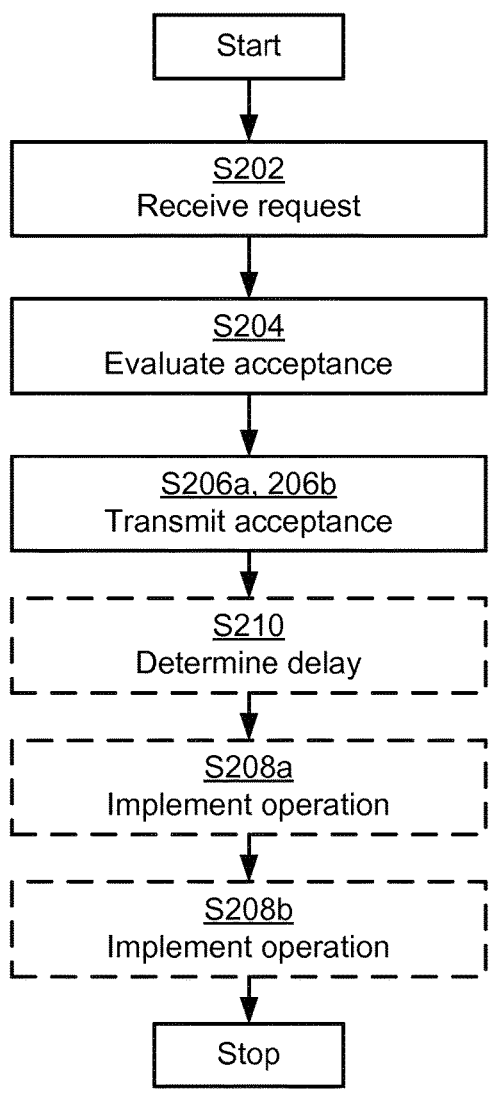

FIGS. 7, 8, 9 and 10 are flow charts illustrating embodiments of methods for establishing a cooperating cluster. The methods of FIGS. 7 and 8 are performed by the first network node $2a$. The methods of FIGS. 9 and 10 are performed by the second network node $2b$. The methods are advantageously provided as computer programs $15a$, $15b$. FIG. 6 shows one example of a computer program product $14a$, $14b$ comprising computer readable means 16. On this computer readable means 16, at least one computer program $15a$, $15b$ can be stored, which at least one computer program $15a$, $15b$ can cause the processing unit 8 and thereto operatively coupled entities and devices, such as the memory 10, the I/O interface 9, the transmitter 12, the receiver 11 and/or the antennae 13 to execute methods according to embodiments described herein. The at least one computer program 15a, 15b and/or computer program product 14a, 14b thus provides means for performing any steps as herein disclosed.

In the example of FIG. 6, the computer program product 14a, 14b is illustrated as an optical disc, such as a CD (compact disc) or a DVD (digital versatile disc) or a Blu-Ray disc. The computer program product 14a, 14b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the at least one computer program 15a, 15b is here schematically shown as a track on the depicted optical disk, the at least one computer program 15a, 15b can be stored in any way which is suitable for the computer program product 14a, 14b.

In general terms, the herein disclosed embodiments are based on determining and using a trigger to trigger a coordination request. The herein disclosed embodiments are also based on using a signaling protocol to enable the cooperation between network nodes in the cooperating cluster. In general terms, the trigger dynamically identifies UEs for coordination and dynamically forms cooperating clusters for the UEs. The signaling protocol enables cooperation between cells using only one message over the backhaul per TTI.

A handshaking protocol which is to signal at least one second network node 2b as identified as a candidate network node to be included in a cooperative cluster will now be disclosed. A method for establishing a cooperating cluster in a cellular communications system performed by a first network node 2a comprises transmitting, in a step S102 and by the transmitter 12 of the first network node 2a a request for establishing a cooperating cluster to a second network node 2b. The at least one computer program 15a, 15b and/or computer program product 14a, 14b thus provides means for transmitting the request. The cooperating cluster comprises at least one cell, such as cell 3g, of the first network node 2a and at least one cell, such as cells 3b, 3f, of the second network node 2b. The request comprises a metric and identification of the cells to be clustered. The signaling thus contains at least one metric. Embodiments disclosing examples of metrics and how the metrics may be defined will be provided below.

The request is thus received by a second network node 2b. A method for establishing a cooperating cluster in a cellular communications system performed by a second network node 2b thus comprises receiving, in a step S202 and by the receiver 11 of the second network node 2b the request as transmitted by the first network node 2a. The at least one computer program 15a, 15b and/or computer program product 14a, 14b thus provides means for receiving the request. This request is evaluated by the second network node in order to determine whether or to accept the request. The processing unit 8 of the second network node 2b is therefore arranged to, in a step S204, evaluate acceptance of the request. The at least one computer program 15a, 15b and/or computer program product 14a, 14b thus provides means for evaluating the acceptance. The evaluation is performed by verifying that an upper limit on allowed number of cooperations has not been reached. The evaluation is further performed by comparing the metric to a metric of any on-going cooperating clusters involving the second network node 2b. Depending on the evaluation the second network node 2b either accepts the request by transmitting an acceptance message or rejects the request by transmitting a rejection message to the first network node 2a. These messages may be transmitted using the X2-interface.

Thus, in a case the acceptance does not cause operation of any previously established and still on-going cooperating clusters involving the second network node 2b to be discontinued or in a case of no on-going cooperation by the second network node 2b the second network node 2b is arranged to, in a step S206a and by the transmitter 12, transmit a direct acceptance of implementing the cooperating cluster to the first network node 2a. The at least one computer program 15a, 15b and/or computer program product 14a, 14b thus provides means for transmitting the direct acceptance.

FIG. 3 is a schematic diagram illustrating a cellular communications system 1c where embodiments presented herein can be applied. The cellular communications system 1c is similar to the cellular communications system 1a of FIG. 1 and thus comprises network nodes 2a-c, cells 3a-j and a served UE 4. FIG. 3 additionally illustrates a cooperating cluster 6a comprising cells 3b, 3f, and 3g. In this cooperating cluster 6a cells 3b and 3f are served by the second network node 2b and the cell 3g is served by the first network node 2a.

Further, in a case the acceptance causes operation of at least one previously established and still on-going cooperating cluster involving the second network node to be discontinued the second network node 2b is arranged to, in a step S206b and by the transmitter 12, transmit an acceptance resulting in delayed implementation of the cooperating cluster at the first network node to the first network node 2a. The at least one computer program 15a, 15b and/or computer program product 14a, 14b thus provides means for transmitting this acceptance.

FIG. 4 is a schematic diagram illustrating a cellular communications system 1d where embodiments presented herein can be applied. The cellular communications system 1d is similar to the cellular communications systems 1a of FIGS. 1 and 1c of FIG. 3 and thus comprises network nodes 2a-c, cells 3a-j and a served UE 4. FIG. 3 additionally illustrates a candidate cooperating cluster 5 comprising cells 3b, 3f, and 3g. In this candidate cooperating cluster 5 cells 3b and 3f are served by the second network node 2b and cell 3g is served by the first network node 2a. FIG. 3 additionally illustrates an on-going cooperating cluster 6b comprising cells 3d and 3e. In this on-going cooperating cluster 6b cell 3d is served by the second network node 2b and cell 3e is served by the third network node 2c.

In other cases (i.e., in cases where the conditions of neither step S206a nor step S206b are fulfilled) a rejection message may be sent by the second network node 2b.

The acceptance as transmitted by the second network node 2b is thus received by the first network node 2a. The receiver 11 of the first network node 2a is thus arranged to, in a step S104, receive the acceptance from the second network node 2b and thus to implement operation of the cooperating cluster. The at least one computer program 15a, 15b and/or computer program product 14a, 14b thus provides means for receiving the acceptance.

According to an embodiment operation of the thus formed cooperating cluster 6a involves power adjusting downlink transmission and/or uplink transmission in the at least one cell 3b, 3f of the second network node 2b in at least one transmission time interval, TTI, slot. Power adjustment is schematically illustrated in FIG. 3; cells 3b and 3f in the cooperating cluster 6a consisting of cells 3b, 3f and 3g are illustrated as being power adjusted. The power adjustment may involve a network node to mute its transmission in one of the cells in the cooperating cluster 6a.

An embodiment relating to the above disclosed exchange of messages between first network node 2a and the second network node 2b (and also, if present, a third network node 3c) will now be disclosed.

Figure 11:
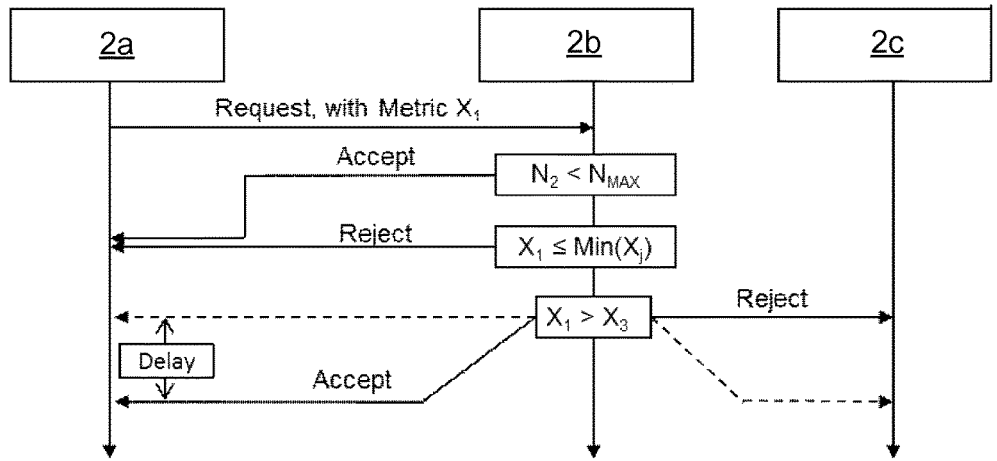
FIGS. 11 and 12 are sequence diagrams of methods according to embodiments presented herein.

FIG. 11 is a signal flow diagram schematically illustrating messages being passed between the first network node 2a, the second network node 2b and the third network node 2c. For illustrative purposes it is assumed that the second network node 2b neighbours the first network node 2a and the third network node 2c, such as in FIGS. 1, 2, 3 and 4.

Each network node 2a-c may be arranged to calculate or estimate a metric, hereinafter denoted X. Embodiments disclosing examples of metrics and how the metrics may be defined will be provided below.

A first metric (denoted condition A) could be that the UE 4 has a strong interferer, i.e. either that the RSRP of an interfering cell relative to the RSRP of the serving cell is above a threshold, for example as indicated by one of Equations E1-E5 below. That is, according to an embodiment the metric indicates that a UE 4 in the cooperating cluster has a strong interferer in the at least one cell of the second network node.

A second metric (denoted condition B) could be that the UE 4 is estimated to have sufficient remaining session data to transmit relative to the delay. Compared to the coordination delay the duration of the session should be long enough to be beneficial from the coordination. That is, according to an embodiment the metric indicates that a UE 4 in the cooperating cluster has a predetermined amount of remaining session data to be transmitted.

A third metric (denoted condition C) could be that the estimated gain in user bit-rate or throughput is sufficient if the coordination is to mute or reduce power of a neighbor cell. That is, according to an embodiment the metric indicates an estimated gain in user bit rate or throughput for a UE 4 in the cooperating cluster if the cooperating cluster is implemented.

A fourth metric (denoted condition D) could be that the size of cooperating cluster is reasonable in terms of computational complexity. This "reasonable" size may thus depend on the actual implementation and on the actual hardware and/or software of the network nodes 2a-c.

To establish cooperation, conditions (such as at least one of conditions A, B, C, and D) are used to calculate the metric X. This metric X is used to evaluate if coordination should be initiated as illustrated by the inequalities boxes, which are described in more detailed below. Further the signaling is sent taking into account backhaul delay. Hence signaling is sometimes delayed, illustrated by the 'Delay' box. The first network node 2a sends a request with a metric $X_1$ to the second network node 2b in order to establish cooperation with a cell served by the second network node 2b, as in step S102. It hence follows that $X_1$ is above the trigger initiation threshold (if such a threshold is used), i.e. a threshold to send a request derived for at least one of the above disclosed metrics. Upon receiving the coordinating request in step S202, the second network node 2b in step S204 evaluates acceptance of the request e.g. by verifying that an upper limit, denoted as $N_{MAX}$, on the allowed number of cooperations has not been reached. This may correspond to evaluating metric D as disclosed above. To simplify the description, but without losing generality, it is for illustrative purposes assumed that the maximum number of cells to coordinate is 2, that is, $N_{MAX}=2$. There will be two situations for the target cell served by the second network node 2b:

In a first case the target cell served by the second network node 2b is assumed not to be in cooperation with any cell served by the third network node 2c. Denote $N_2$ as the size of the coordinating cluster of the second network node 2b. Thus $N_2=1$. Since $N_2<N_{MAX}$, the second network node 2b accepts the coordinating request from the first network node 2a as in step S206a and a coordinating cluster 6a is established.

In a second the target cell served by the second network node 2b is assumed to already cooperate with a neighboring cell served by the third network node 2c (as in FIG. 4), i.e. $N_2=2$, or assumed also to receive a request from the third network node 2c. The second network node 2b then compares the metric $X_1$ received from the first network node 2a and the metric $X_3$ received from the third network node 2c.

If the metric $X_1$ is larger than the metric $X_3$, the second network node 2b accepts the cooperation with the first network node 2c and rejects the cooperation with the third network node 2c.

If the cooperation with the third network node 2c is already in effect a delay could be needed before accepting the request from the first network node 2a, as in step S206b, or sending the reject to the third network node 2c. The delay is determined so that the cooperation between the second network node 2b and the third network node 2c is enabled to be terminated before the second network node 2b starts cooperating with the first network node 2a.

Assuming that the cluster delay (i.e., the time delay between transmission and reception of a message transmitted from one network node to another network node in the cooperating cluster) for the cooperating cluster 6b involving the third network node 2c is 10 ms, this would imply that cooperation with the third network node 2c currently occurs for TTI n+9 (n being current TTI). Hence the first TTI that cooperation between the first network node 2a and the second network node 2b can be started is for TTI n+10. If the delay between the first network node 2a and the second network node 2b is smaller than 10 ms, for example 7 ms, an additional delay of 3 ms is needed before sending the acceptance in step S206b. Similarly, if the cluster delay is larger, say 15 ms, a delay of 4 ms is needed before sending the reject to the third network node 2c; hence continuing this on-going cooperation also for TTIs n+11, . . . , n+14 as the first TTI of the cooperation with the first network node 2a is TTI n+15. This delay is not necessarily a delay for when the message is transmitted over the backhaul; it could instead be a value added to the validity indicator included in messages transmitted over the backhaul, i.e. the message is marked as valid for TTI n+15.

In embodiments where the cooperation is relying on backhaul communication, the establishment of the a cooperating cluster 6a may take into account the backhaul delay in order for the second network node 2b to know when to trigger implement operation of the cooperating cluster such that the operation benefits the most from the properties of the cooperating cluster. As noted above, one example of operation of the thus formed cooperating cluster 6a involves power adjusting downlink transmission and/or uplink transmission in the at least one cell 3b, 3f of the second network node 2b in at least one transmission time interval, TTI, slot. Further, as is clear from the signal flow diagram of FIG. 11, the herein disclosed mechanisms for establishing a cooperating cluster do not rely on any feedback signalling between the network nodes 2a-c and thus enable the delay between calculating the metrics and executing operation of the cooperating clyster, such as the above disclosed power adjustment, to be minimized. Particularly, the processing unit 8 of the first network node 2a may therefore be arranged to, in an optional step S106a, implement operation of the cooperating cluster 6a based on the acceptance as received in step S104 and without further exchange of acknowledgement messages related thereto with the second network node 2b. The at least one computer program 15a, 15b and/or computer program product 14a, 14b thus provides means for implementing the operation. Likewise, the processing unit 8 of the second network node 2b may be arranged to, in an optional step S208b, implement operation of the cooperating cluster 6a without further exchange of acknowledgement messages related thereto with the first network node 2a. The at least one computer program 15a, 15b and/or computer program product 14a, 14b thus provides means for implementing this operation. Each network node 2a-c thereby experiences only the maximum one way delay; this implies that for each network node 2a-c the delay is less or equal to half the delay experienced in currently known cellular communications systems.

To illustrate how the delay may be considered it is assumed that the delay between the network nodes 2a-c is known. This delay may be estimated using known methods, for example using pinging.

Figure 12:
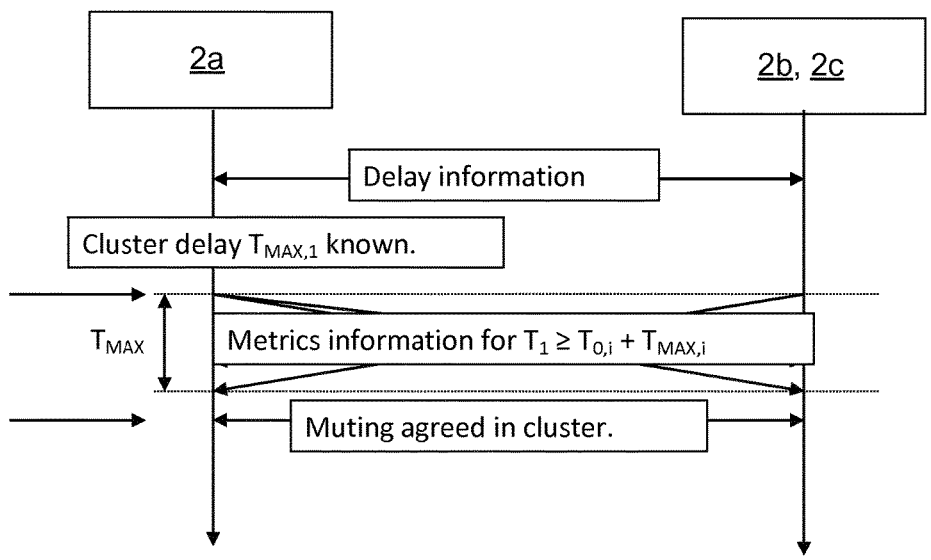

According to embodiments a validity timer $T_1$ is introduced when the metric is transmitted from the first network node 2a. This timer is set so that for each network node i the metric is calculated at a time $T_{o,i}$ such that the maximum delay $T_{MAX,i}$ from network node i to the other network nodes is small enough such that $T_1 \geq T_{o,i} + T_{MAX,i}$. This simply means that the validity is for a TTI after when the message arrives. This is illustrated in the signal flow diagram of FIG. 12. The processing unit 8 of the first network node 2a may thus be arranged to, in an optional step S106b, implement operation of the cooperating cluster 6a at a predetermined delay after transmitting the request, where the predetermined delay corresponds to a point in time beyond the point in time for receiving the acceptance (as in step S104). Likewise, the processing unit 8 of the second network node 2b may be arranged to, in an optional step S208a, implement operation of the cooperating cluster at a predetermined delay after transmitting the direct acceptance (as in step S206a). The at least one computer program 15a, 15b and/or computer program product 14a, 14b thus provides means for implementing this operation. The acceptance (as transmitted in step S206b) resulting in delayed implementation at the first network node 2a may by the transmitter 12 of the second network node 2b be transmitted as a direct acceptance for delayed implementation or as a delayed acceptance. Further, the processing unit 8 of the second network node 2b may be arranged to, in an optional step S210, determine the delay to allow operation of any on-going cooperating cluster 6b involving the second network node 2b to be discontinued before the cooperating cluster 6a with the first network node 2a is implemented. The at least one computer program 15a, 15b and/or computer program product 14a, 14b thus provides means for determining this delay.

The above disclosed times may be quite different; for example, $T_{MAX}$ can take a first value, say 2 ms, for a first group of the network nodes, say for the second network node 2b and the third network node 2c, and a second value, say 1 ms, for a second group of network nodes, say the first network node 2a. One reason may be that the backhaul between the first group of network nodes may pass the second group of network nodes. Further, the time when each network node 2a-2c transmits can be different; a network node with a short delay may then wait as long as possible to transmit in order to ensure that the message transmitted contains a most recently acquired prediction of the metric included in the message.

One purpose of establishing a cooperating cluster is to reduce interference from the neighboring cells and to improve the performance of a UE 4 at cell edges. To establish the cooperating cluster 6a, strong interfering cells should thus be included in the cooperating cluster to be established. According to an embodiment the request as transmitted in step S102 may therefore be generated based on the receiver 11 of the first network node 2a receiving, in an optional step S108a, a measurement report from a UE 4 in the cooperating cluster to be established or from another network node (such as the second network node 2b and/or the third network node 2c). The at least one computer program 15a, 15b and/or computer program product 14a, 14b thus provides means for receiving the measurement report. The measurement report provides an indication of channel quality for the UE 4. In general terms, a strong neighboring cell has potential to be a high interfering cell, thus measurement reports, such as handover measurement reports, may be taken into the consideration when the cooperating cluster 6a is to be established. To capture strong interference from neighboring cells, the Channel Quality Indicator (CQI) report could be taken into account since this report can provide an indication whether a UE 4 is heavily interfered by at least one strong neighboring cell. What is considered a heavy interference may be determined by comparing the perceived interference (as determined e.g. from measurement reports) to threshold values. Further data may be derived from link adaptation for the particular UE 4. This further data may provide the current modulation and coding scheme (MCS) and rank that the channel supports towards the UE 4. Hence, this gives even further information about the need for coordination of the interferers. One trigger in the first network node 2a is thus to initiate establishment of a cooperating cluster 6a of a served UE 4 based upon the available data in the first network node 2a. This available data may for example comprise CQI reports and handover measurements, but any available measurement reports that give indication of the channel quality can be used; the herein disclosed subject matter is not limited in this resect. The measurement report may thus be provided as a channel quality indicator, CQI, report, link adaptation parameters, and/or handover measurements.

FIG. 2 is a schematic diagram illustrating a cellular communications system 1b where embodiments presented herein can be applied. The cellular communications system 1b is similar to the cellular communications systems 1a of FIG. 1, 1c of FIG. 3, and 1d of FIG. 4 and thus comprises network nodes 2a-c, cells 3a-j and a served UE 4. FIG. 2 additionally illustrates a candidate cooperating cluster 5 comprising cells 3b, 3f, and 3g. In this candidate cooperating cluster 5 cells 3b and 3f are served by the second network node 2b and cell 3g is served by the first network node 2a. According to an embodiment the request as transmitted in step S102 may be generated based on the processing unit 8 of the first network node 2a identifying, in an optional step S108b, a candidate cooperating cluster 5 based on at least one measurement report. The at least one computer program 15a, 15b and/or computer program product 14a, 14b thus provides means for identifying the candidate cooperating cluster. The candidate cluster 5 comprises at least the at least one cell of the first network node 2a and the at least one cell of the second network node 2b. According to an embodiment the request is generated by, the processing unit 8 of the first network node 2a being arranged to, in an optional step S108c, determine whether or not the candidate cooperating cluster 5 can improve traffic conditions as obtained from the measurement report for the UE 4. The at least one computer program 15a, 15b and/or computer program product 14a, 14b thus provides means for performing this determination. The processing unit 8 of the first network node 2a is then further arranged to, in an optional step S108d, define the candidate cooperating cluster 5 as the cooperating cluster 6a for the UE if the candidate cooperating cluster 5 can improve these traffic conditions. The at least one computer program 15a, 15b and/or computer program product 14a, 14b thus provides means for performing this definition. The determining in steps S108c may be based on further properties and measurements reports. For example, the determining in step S108c may be based on a current backhaul capacity and and/or a current backhaul delay. Further, according to this embodiment also scheduling for the cooperating cluster 6a may be determined. Thus, the processing unit 8 of the first network node 2a may be further arranged to, in an optional step S110, determine scheduling for the cooperating cluster 6a. The at least one computer program 15a, 15b and/or computer program product 14a, 14b thus provides means for determining this scheduling.

Moreover, to establish a cooperating cluster enabling efficient operation and to avoid unnecessary clustering and signaling, the trigger may also reflect the impact of coordination and the gain of the coordination. As herein described each individual network node 2a-c (as herein exemplified by the first network node 2a) is enabled to independently trigger a cooperating process. The triggering may use a predictor relating to potential coordination gains. In general terms, current communications systems require continues signaling between network nodes 2a-c. One motivation for cooperating gains from coordinated scheduling is bad geometry in a network, i.e. how the network nodes 2a-2c are located in the network. Hence the trigger may also capture geometry aspects whereas current communications systems use instead the signal strength from an interfering network node. The geometry of a UE 4 in the downlink is $$G(serving) * P(serving) / \Sigma(G(interferer) \cdot P(interferer)),$$

where $\Sigma$ denotes the summations operator, G denotes gain and P denotes power, and where the summation is taken over all network nodes producing an interference above a predetermined threshold level. Thus the geometry for a UE 4 is dependent on the gain of the serving network node of the UE 4 as well as the gain of all interfering network nodes and the power of the serving network node of the UE 4 as well as the power of all interfering network nodes This implies that a first estimator can be formulated as $$RSRP(serving) / \Sigma SRP(interferer),$$

where RSRP denotes the reference signal received power parameter. This also implies that a second estimator can be formulated either as $$RSRQ(serving)$$

which is a underestimate, and where RSRQ denotes the reference signal received quality parameter, or as $$1/(1/RSRQ(serving)-1).$$

It is firstly assumed that the RSRPs of the interferers' measurements are available. If the RSRP for the strongest interferer is known this implies that under the restriction that there are N interfering network nodes the cooperating clusters have a size of 2 cells, the improvement in geometry to be improved without performing a joint decision is given by taking the threshold Thr such that there are N interferers for each UE i fulfilling $$RSRP_{Int}(i)/RSRP_{Ser}(i) > Thr, \qquad (E1)$$

where $RSRP_{Int}(i)$ is the interfering RSRP for UE i and where $RSRP_{Ser}(i)$ is the serving RSRP for UE i. This is under the assumption that all UE 4 have enough data to transmit over the full bandwidth of the downlink. If a UEs does not fulfill this criteria and this UE, for example, only is able to transmit on a portion $\alpha$ of the bandwidth (for example VoIP), the geometry may be estimated based on the expression $$\alpha(i) RSRP_{Int}(i)/RSRP_{Ser}(i) > Thr \qquad (E2)$$

It is secondly assumed that the RSRQ of the interferer's measurements are available. For this case a better estimator of the geometry may, depending on measurement errors, be formulated as $$RSRQ_{Int} = RSRP_{Int}/\Sigma RSRP_{all} \qquad (E3)$$

Hence a good threshold may be given by $$RSRP_{Int}/(RSRP_{Int}/RSRQ_{Int} - RSRP_{Ser}) > Thr. \qquad (E4)$$

Similar to the RSRP case also the used bandwidth a of a UE i may be taken into account:

$$\alpha(i) RSRP_{Int}(i)/(RSRP_{Int}(i)/RSRQ_{Int}(i) - RSRP_{Ser}(i)) > Thr. \qquad (E5)$$

One trigger, could therefore be to in the first network node 2a (i.e. the network node serving the UE) initiate establishment of the cooperating cluster with one or more neighboring network nodes (such as the second network node 2b and/or the third network node 2c) only when the identified factors are fulfilled.

Two non-limiting illustrative examples are provided, e.g. to give an understanding of the impact of gain estimation after that the cooperating cluster is formed. In the examples it is assumed a network which has different capability of the deployed UE 4. That is, which standardized reports the UE 4 support. How such an estimation may be calculated is known as such. For the legacy case a UE 4 is capable to transmit standardized reports such as CQI (channel quality indicator) and handover measurement reports. The CQI report consists of only the CQI measurement from the serving network node. It can be used to estimate the capability of the UE for a current interference situation. There is no CQI measurement from neighboring cells for the legacy UEs. However, handover measurements may then be used to estimate the interference contribution of the cells in the handover measurement report. In this case, the cells to be coordinate are limited to the cells given by the handover measurement report.

According to an embodiment the measurement report comprises two different channel quality indicator, CQI, reports for a UE in the cooperating cluster. For example, in the case when a UE 4 is transmission mode 10 capable, the CQI measurement reports can be designed to cover more interference situations of measurement which is able to capture different interference situation. One example is that the macro site in a Hetnet deployment is muted. The report may also be used for other scenarios; for example the two most important interference scenarios could be considered and the evolved CQI report may be used to capture when a neighbor cell is transmitting and when it is not transmitting. The two CQI reports can be used to estimate the gain between the two interference situations. A mechanism that could be foreseen is hence to use the standard support given in the introduction of TM10. Another feature supported in the 3GPP standard is ABS (almost bland subframes) and this gives the possibility to design two ABS patterns using the trigger as herein described for establishing a cooperating cluster. Different ABS patterns could be defined for different UEs depending on which cell is the main interferer.

In general terms, for a UE 4 the gain from coordinated scheduling (as provided by the cooperating cluster 6a) is dependent upon how much data the UE 4 will transmit/receive during its session. Further, transmission/reception delays in the coordinated scheduling, especially delays in the backhaul between network nodes in the cooperating cluster may have an impact on the decision regarding whether it is beneficial to initiate establishment of coordinated scheduling for an UE or not. For example, the session data of the UE 4 may be estimated using buffer reports made available to the first network node 2a and proxys/servers that the radio network can collect information from. Further DPI (Deep Packet Inspection) of the user data can be used to estimate the amount of data and session duration of the UE 4. For example, let T be the time (measured in second) that a UE 4 needs to empty its data buffer, let B be the predicted bit rate (measured in bits/s) and let E be the total number of bits that the UE 4 will transmit. The session duration may then be estimated simply by T=E/B. According to an embodiment the predetermined amount of remaining session data is thus estimated from at least one of a buffer report, and deep packet inspection, DPI.

The cooperation initiation metric X disclosed above can be sent together or separately with a scheduling metric as pre-defined, for example, by the operator depending on the goal of cooperation. According to an embodiment the request as transmitted in step S102 therefore further comprises a scheduling metric. As will be further disclosed below the scheduling metric may relating to at least one of estimated gain in signal to noise and interference ratio, SINR, and reduction in transmission power for a UE 4 in the cooperating cluster 6a to be established. How such a scheduling metric can be determined is known as such. In relation to the herein disclosed subject matter the scheduling metric can be defined as, for example, the gain in SINR, denoted ΔSINR, that can be achieved if a target cell served by the second network node 2b is muted, or more generally its transmission power is being adjusted. The scheduling metric may additionally or alternatively be related to the increase in user bitrate for the UE 4 if the target cell served by the second network node 2b is muted, or more generally its transmission power is being adjusted. The scheduling metric may additionally or alternatively be related to the increase in Quality of Service Quality (QoS) that a cell served by the first network node 2a can achieve if the target cell served by the second network node 2b is muted, or more generally its transmission power is being adjusted. If $N_{MAX}>2$ the scheduling metric could be determined for all or some of the muting hypothesis for the cooperating cluster 6a to be established. For example, if $N_{MAX}=3$, up to 8 different muting hypothesis could be included. An example of a scheduling metric is given as follows:

$$X = \max_C \sum_{t \in C} \frac{R_t}{\overline{R}_t^\beta}$$

where the $R_t$ is instantaneous rate of UE 4 in cell i and $\overline{R}_t$ is historical average rate of UE in cell i. C is a set of cells or a cluster of cells. β is a tuning parameter for the fairness between high rate users and lower rate users.

In general terms, if present, the scheduling metric may be used differently from the cooperation metric. In general terms, the cooperation metric is used to initiate cooperation and can be potentially defined differently or equally to the scheduling metric, even if the same underlying metric is used, i.e. gain in bit-rate. As a non-limiting example, assume that a cell served by the first network node 2a serves 10 UEs. The cooperation metric may then be defined as a joint/average metric for cooperating with e.g., the second network node 2b to protect a subset, say 2, of the UEs who are interfered heavily by one or more cells served by the second network node 2b. When the cooperation is established, the first network node 2a may be arranged to transmit the scheduling metric based on a TTI muting/power decision which is determined for the UE to be schedule in the TTI when at least one cell served by the second network node 2b is muted/power-reduced.

For the scheduling metric used for muting each cell, e.g. cell 3g which is one cell served by the first network node 2a, the scheduling metric may be determined for cases when the at least one target cell served by the second network node 2b in the cooperating cluster 6a is muted or unmuted. Evaluation of the scheduling metric may include hypnoses when one or more cells in the cooperating cluster 6a are muted, including the initial cell, cell 3g, to be muted. The criteria that gives the muting metric can also comprise a component relating to energy cost or the gain that other cells 3h, 3j served by the first network node 2a may gain from muting cell 3g, and hence the muting metric is not necessarily zero for the case that cell 3g is muted, even if many metrics would be zero when cell 3g is muted. The signaling may thus enable the first network node 2a to determine a total scheduling metric for the cooperating cluster to be established based on either sending or muting cell 3g, and thereby determine whether or not to mute cell 3g. Further, the first network node 2a know exactly which other cells are muted in the cooperating cluster 6a (as the first network node 2a knows the scheduling metric and hence which cells are muted to achieve the scheduling metric value.

According to the above different embodiments of methods for establishing a cooperating cluster 6a have been described. The cooperating cluster 6a may further be released. As disclosed above, operation of an on-going cooperating cluster 6b may be terminated in a case a candidate cooperating cluster 5 related to the on-going cooperating cluster 6b and with e.g. a metric higher than the metric of the on-going cooperating cluster 6b is identified. Operations of the cooperating cluster 6a may further be terminated when cooperation between the network nodes in the cooperating cluster no longer is need. This may occur when the UE 4 who originally was suffering from interference has finished its transmission or has left the interfering area. Cooperating clusters may thereby be dynamically established and released based on their herein defined metrics. Upon receiving a request for releasing operation of the cooperating cluster, the cooperating network nodes may reduce the size coordinating cluster or release it completely. This request may be transmitted by the network node that is currently serving the UE 4 of the cooperating cluster 6a.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for establishing a cooperating cluster in a cellular communications system, the method being performed by a first network node, the method comprising:
   transmitting a request for establishing the cooperating cluster to a second network node, the cooperating cluster comprising at least one cell of the first network node and at least one cell of the second network node, the request comprising at least one metric and an identification of the cells to be clustered, wherein the at least one metric indicates that a user equipment in the cooperating cluster has a predetermined amount of remaining session data to be transmitted; and
   receiving an acceptance from the second network node to implement operation of the cooperating cluster;
   receiving a measurement report from the user equipment in the cooperating cluster or from another network node, the measurement report providing an indication of channel quality for the user equipment;
   identifying a candidate cooperating cluster based on the measurement report, the candidate cooperating cluster comprising at least the at least one cell of the first network node and the at least one cell of the second network node;
   determining whether the candidate cooperating cluster can improve traffic conditions as obtained from the measurement report for the user equipment; and as a result of determining that the candidate cooperating cluster is able to improve traffic conditions, defining the candidate cooperating cluster as the cooperating cluster for the user equipment,
   wherein the determination of whether the candidate cooperating cluster can improve traffic conditions is based on one or more of a current backhaul capacity and/or a current backhaul delay,
   wherein the predetermined amount of remaining session data is estimated from at least one of a buffer report and deep packet inspection, and
   wherein the request further comprises the at least one metric further indicating the size of the cooperating cluster, according to the computational complexity of the cluster.

2. The method of claim 1, further comprising:
   implementing the operation of the cooperating cluster based on the received acceptance and without further exchange of acknowledgement messages related thereto with the second network node.

3. The method of claim 1, further comprising:
   implementing the operation of the cooperating cluster at a predetermined delay after transmitting the request, the predetermined delay corresponding to a point in time beyond receiving the acceptance.

4. The method of claim 1, further comprising:
   determining scheduling for the cooperating cluster.

5. The method of claim 1, wherein the measurement report is provided as a channel quality (CQI) report, link adaptation parameters, and/or handover measurements.

6. The method of claim 1, wherein the measurement report comprises two different channel quality (CQI) reports for the user equipment in the cooperating cluster.

7. The method of claim 6, wherein the at least one metric indicates that the user equipment in the cooperating cluster has a strong interferer in the at least one cell of the second network node.

8. The method of claim 1, wherein the at least one metric indicates an estimated gain in user bit rate or throughput for the user equipment in the cooperating cluster if the cooperating cluster is implemented.

9. The method of claim 1, wherein the request further comprises a scheduling metric, the scheduling metric relating to at least one of: estimated gain in signal to noise and interference ratio (SINR) and reduction in transmission power for the user equipment in the cooperating cluster.

10. The method of claim 1, further comprising:
    defining a trigger based on standard measurement reports of network characteristics, wherein the trigger identifies candidate UE and cells that benefit from coordination;
    determining whether to establish the cooperating cluster based on radio conditions and traffic characteristics of the candidate UE; and
    upon a determination to establish the cooperating cluster, performing the steps of transmitting and receiving.

11. A first network node for establishing a cooperating cluster in a cellular communications system, the first network node comprising:
    a transmitter arranged to transmit a request for establishing a cooperating cluster to a second network node, the cooperating cluster comprising at least one cell of the first network node and at least one cell of the second network node, the request comprising at least one metric and an identification of the cells to be clustered, wherein the at least one metric indicates that a user equipment in the cooperating cluster has a predetermined amount of remaining session data to be transmitted; and
    a receiver arranged to receive an acceptance from the second network node to implement operation of the cooperating cluster, receive a measurement report from the user equipment in the cooperating cluster or from another network node, the measurement report providing an indication of channel quality for the user equipment;
    a processing unit arranged to:
       identify a candidate cooperating cluster based on the measurement report, wherein the candidate cooperating cluster comprises at least the at least one cell of the first network node and the at least one cell of the second network node;
       determine whether the candidate cooperating cluster can improve traffic conditions as obtained from the measurement report for the user equipment; and
       as a result of determining that the candidate cooperating cluster is able to improve traffic conditions, define the candidate cooperating cluster as the cooperating cluster for the user equipment,
       wherein the determination of whether the candidate cooperating cluster can improve traffic conditions is based on one or more of a current backhaul capacity and/or a current backhaul delay,
       wherein the predetermined amount of remaining session data is estimated from at least one of a buffer report and deep packet inspection, and
       wherein the request further comprises the at least one metric further indicating the size of the cooperating cluster, according to the computational complexity of the cluster.

12. A computer program product comprising a non-transitory computer readable medium storing a computer program for implementing the method steps of:

transmitting, from a first network node, a request for establishing a cooperating cluster to a second network node, the cooperating cluster comprising at least one cell of the first network node and at least one cell of the second network node, the request comprising at least one metric and an identification of the cells to be clustered, wherein the at least one metric indicates that a user equipment in the cooperating cluster has a predetermined amount of remaining session data to be transmitted;

receiving, at the first network node, an acceptance from the second network node to implement operation of the cooperating cluster;

receiving, at the first network node, a measurement report from the user equipment in the cooperating cluster or from another network node, the measurement report providing an indication of channel quality for the user equipment;

identifying, by the first network node, a candidate cooperating cluster based on the measurement report, the candidate cooperating cluster comprising at least the at least one cell of the first network node and the at least one cell of the second network node;

determining, at the first network node, whether the candidate cooperating cluster can improve traffic conditions as obtained from the measurement report for the user equipment; and as a result of determining, at the first network node, that the candidate cooperating cluster is able to improve traffic conditions, defining, by the first network node, the candidate cooperating cluster as the cooperating cluster for the user equipment, wherein the determination of whether the candidate cooperating cluster is able to improve traffic conditions is based on one or more of a current backhaul capacity and/or a current backhaul delay, wherein the predetermined amount of remaining session data is estimated from at least one of a buffer report and deep packet inspection, and wherein the request further comprises the at least one metric further indicating the size of cooperating cluster, according to the computational complexity of the cluster.

* * * * *